(12) United States Patent
Hirukawa

(10) Patent No.: US 10,391,848 B2
(45) Date of Patent: Aug. 27, 2019

(54) ENGINE MOUNTING STRUCTURE

(71) Applicant: ISUZU MOTORS LIMITED, Shinagawa-ku, Tokyo (JP)

(72) Inventor: Kouji Hirukawa, Yokohama (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 15/779,498

(22) PCT Filed: Nov. 4, 2016

(86) PCT No.: PCT/JP2016/082782
§ 371 (c)(1),
(2) Date: May 25, 2018

(87) PCT Pub. No.: WO2017/090407
PCT Pub. Date: Jun. 1, 2017

(65) Prior Publication Data
US 2018/0334024 A1    Nov. 22, 2018

(30) Foreign Application Priority Data

Nov. 27, 2015 (JP) .................. 2015-231686

(51) Int. Cl.
*B60K 5/12* (2006.01)
*B60K 5/02* (2006.01)
(Continued)

(52) U.S. Cl.
CPC ................. *B60K 5/12* (2013.01); *B60K 5/02* (2013.01); *B60K 13/02* (2013.01); *B60K 13/04* (2013.01);
(Continued)

(58) Field of Classification Search
CPC .......... B60K 5/02; B60K 11/00; B62D 33/06; F02B 33/34; F02B 35/10
See application file for complete search history.

(56) References Cited

U.S. PATENT DOCUMENTS

2007/0023221 A1    2/2007  Okuyama et al.
2014/0332306 A1*  11/2014  Fuqua .................. B60K 5/02
                                                                        180/291

FOREIGN PATENT DOCUMENTS

JP    S61-046232 U1    3/1986
JP    01119421 A  *  5/1989
(Continued)

OTHER PUBLICATIONS

International Search Report and Written Opinion for related International Application No. PCT/JP2016/082782, dated Dec. 13, 2016; English translation provided for ISR; 9 pages.
(Continued)

*Primary Examiner* — Bryan A Evans
(74) *Attorney, Agent, or Firm* — Procopio, Cory, Hargreaves & Savitch LLP

(57) ABSTRACT

Provided is an engine mounting structure for a cab-over type vehicle wherein an engine 10 is mounted on a left and right pair of chassis frame members 3L, 3R extending in the front-rear direction of the vehicle body, and wherein a cab 2 is disposed above the engine 10. The engine 10 has exhaust system connected to either the left or right side surface of the engine 10, and the engine 10 is mounted on the chassis frame members 3L, 3R at a predetermined angle so that the either the left or right side surface faces upward.

4 Claims, 1 Drawing Sheet

(51) Int. Cl.
*B60K 13/04* (2006.01)
*F01N 1/00* (2006.01)
*B60K 13/02* (2006.01)
*F01N 3/08* (2006.01)
*F02M 35/10* (2006.01)
*F02M 35/16* (2006.01)

(52) U.S. Cl.
CPC ............... *F01N 1/00* (2013.01); *F01N 3/08* (2013.01); *F02M 35/10157* (2013.01); *F02M 35/164* (2013.01)

(56) References Cited

FOREIGN PATENT DOCUMENTS

| | | |
|---|---|---|
| JP | H01-119421 A | 5/1989 |
| JP | H10280967 A | 10/1998 |
| JP | 2000199432 A | 7/2000 |
| JP | 2002-036888 A | 2/2002 |
| JP | 2006-328954 A | 12/2006 |
| JP | 2013-127223 A | 6/2013 |
| JP | 2014-163290 A | 9/2014 |

OTHER PUBLICATIONS

Extended European Search Report for related EP App No. 16868356.3 dated Apr. 25, 2019, 7 pgs.

\* cited by examiner

[FIG.1]
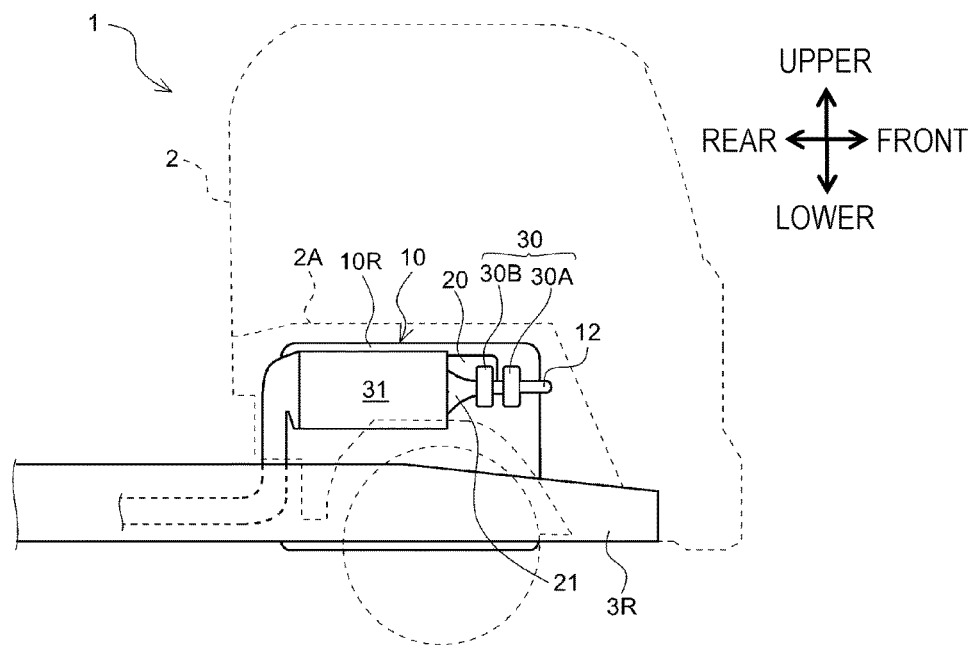
[FIG.2]
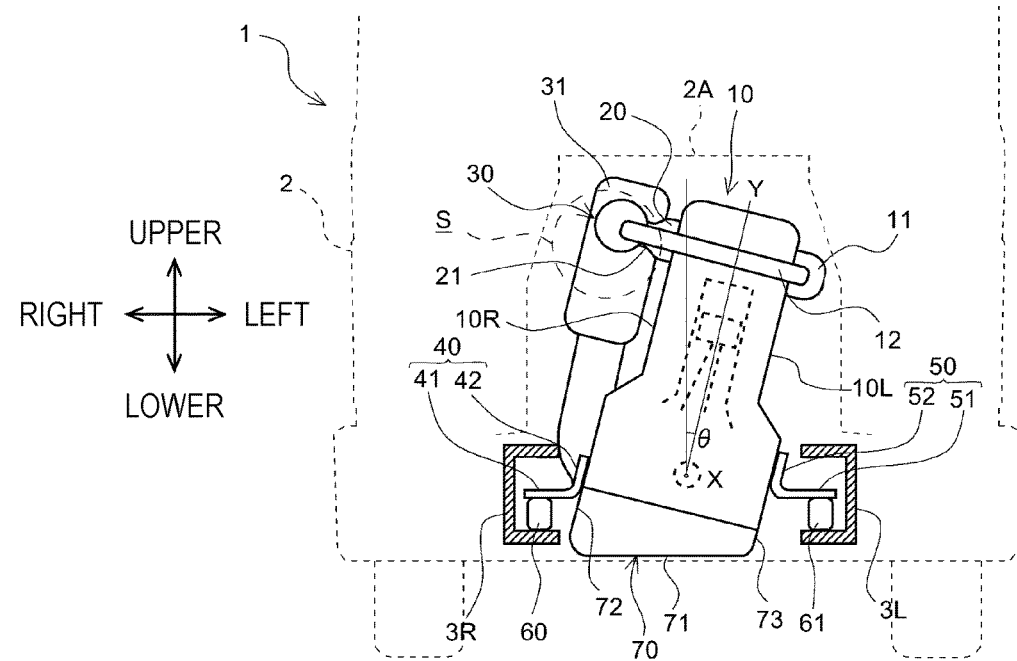

ENGINE MOUNTING STRUCTURE

CROSS-REFERENCE TO RELATED APPLICATIONS

This application is a U.S. National Stage entry of PCT Application No: PCT/JP2016/082782 filed on Nov. 04, 2016, which claims priority to Japanese Patent Application No. 2015-231686, filed Nov. 27, 2015, the contents of which are incorporated herein by reference.

TECHNICAL FIELD

The disclosure relates to an engine mounting structure, and particularly, to an engine mounting structure for a cab-over type vehicle.

BACKGROUND ART

Generally, in a cab-over type vehicle, an engine is mounted on the front end side of a chassis frame and a cab is disposed above the engine. Such a cab-over type vehicle is disclosed in PTL 1, for example.

CITATION LIST

Patent Document

PTL 1: Japanese Patent Laid-Open Publication No. 2002-036888

SUMMARY OF INVENTION

Technical Problem

By the way, in a cab-over type vehicle, peripheral equipment such as a radiator and a supercharger is accommodated in a limited space in an engine room. Therefore, an exhaust gas after-treatment device has to be installed in a chassis frame behind a cab, a distance from a turbine outlet of the supercharger to the exhaust gas after-treatment device is lengthened, and the exhaust gas temperature at the inlet of the exhaust gas after-treatment device tends to be lowered. As a result, the catalyst temperature is liable to be lower than the activation temperature, and there is a problem that the purification performance of the catalyst is degraded.

The disclosure aims to provide an engine mounting structure capable of effectively utilizing a space of an engine room in a cab-over type vehicle.

Solution to problems

The disclosure provides an engine mounting structure for a cab-over type vehicle in which an engine is mounted on a pair of left and right chassis frames extending in a front and rear direction of a vehicle body and a cab is disposed above the engine. An exhaust system is connected to one of left and right side surfaces of the engine, and the engine is mounted on the chassis frames in a state of being inclined at a predetermined angle such that the one side surface faces obliquely upward.

The engine may include a supercharger that is disposed adjacent to the one side surface.

An exhaust gas after-treatment device may be connected to the exhaust system on the downstream side of the supercharger, and the exhaust gas after-treatment device may be disposed adjacent to the supercharger.

Advantageous Effects of Invention

According to the disclosure, it is possible to effectively utilize the space of the engine room.

BRIEF DESCRIPTION OF DRAWINGS

FIG. 1 is a schematic view of an engine mounting structure according to an embodiment of the disclosure in a side view of a vehicle body; and FIG. 2 is a schematic view of the engine mounting structure according to the embodiment of the disclosure in a front view of the vehicle body.

DESCRIPTION OF EMBODIMENTS

Hereinafter, an engine mounting structure according to an embodiment of the disclosure will be described with reference to the accompanying drawings. Identical parts are denoted by the same reference numerals, and their names and functions are also the same. Therefore, detailed description thereof will not be repeated.

As shown in FIGS. 1 and 2, an engine mounting structure of the present embodiment is a mounting structure of a diesel engine (hereinafter, simply referred to as "engine") 10 accommodated below a cab 2 of a cabover type vehicle 1. Meanwhile, the reference numeral 2A denotes a cab floor, and the reference numerals 3L, 3R denote a pair of left and right chassis frames extending in a front and rear direction of a vehicle body.

The engine 10 is, for example, a multi-cylinder in-line engine in which a plurality of cylinders is arranged in series in a longitudinal direction (crankshaft direction) of the engine. The engine 10 is mounted so that its crankshaft direction corresponds to the front and rear direction of the vehicle body. In the engine 10 of the present embodiment, an intake system is connected to a side surface (hereinafter, referred to as "left surface") 10L on the left side of the vehicle body, and an exhaust system is connected to a side surface (hereinafter, referred to as "right surface") 10R on the right side of the vehicle body.

An intake manifold 11 is connected to a left surface 10L of the engine 10, and an intake pipe 12 is connected to the intake manifold 11. In the intake pipe 12, an air filter (not shown), a compressor 30A of a supercharger 30 and an intercooler (not shown) and the like are provided in order from the intake upstream side.

An exhaust manifold 20 is connected to a right surface 10R of the engine 10, and an exhaust pipe 21 is connected to the exhaust manifold 20. In the exhaust pipe 21, a turbine 30B of the supercharger 30 and an exhaust gas after-treatment device 31 and the like are provided in order from the exhaust upstream side.

In the present embodiment, as shown in FIG. 2, the engine 10 is mounted in such a manner that the right surface 10R to which the exhaust system is connected faces obliquely upward and a cylinder axis direction Y is inclined to the left side of the vehicle body at a predetermined inclination angle θ with a crankshaft center X as a fulcrum in a front view of the vehicle body.

More specifically, the engine mounting structure of the present embodiment includes a right bracket 40 for supporting the right surface 10R of the engine 10 on a right chassis frame 3R via a right mount member 60, and a left bracket 50 for supporting the left surface 10L of the engine 10 on a left chassis frame 3L via a left mount member 61. The right bracket 40 is formed by bending a vertical plate portion 42 at an obtuse angle (90 degrees+θ) with respect to a horizontal plate portion 41. The left bracket 50 is formed by bending a vertical plate portion 52 at an acute angle (90 degrees−θ) with respect to a horizontal plate portion 51. Meanwhile, the angle θ may be set in a range of, for example, 5°≤θ≤60°, preferably 7.5°≤θ≤30°, more preferably 10°≤θ≤20°. Further, an oil pan 70 of the engine 10 has a right wall 72 formed to be higher than a left wall 73 such that a bottom surface 71 of the oil pan 70 is set in a substantially horizontal state when the engine 10 is mounted on the vehicle 1. That is, in the oil pan 70 of the engine 10, the length of the right wall 72 in a direction parallel to the cylinder axis direction Y is longer than that of the left wall 73. In other words, the engine 10 is configured such that an extended line of a bottom surface (i.e., the bottom surface 71 of the oil pan 70) of the engine 10 intersects with an extended line of an upper surface of the engine 10 at the angle θ. The engine 10 is mounted such that the extended line of the upper surface of the engine 10 intersects, at the angle θ, with an extended line of a concave surface of a cab floor 2A having an upwardly convex shape.

In this way, when the engine 10 is mounted such that its intake side is inclined to the left side of the vehicle body, a space S in an engine room located above the right surface 10R of the engine 10 is expanded, and the supercharger 30 and the exhaust gas after-treatment device 31 can be effectively accommodated in the expanded space S. In this way, the supercharger 30 and the exhaust gas after-treatment device 31 are disposed adjacent to the side of the engine 10, so that it is possible to shorten the distance from the exhaust manifold 20 to the exhaust gas after-treatment device 31 via the turbine 30B.

As described in detail above, according to the engine mounting structure of the present embodiment, the intake side of the engine 10 is inclined to the left side of the vehicle body, so that the space S on the exhaust side of the engine 10 is expanded. Since the supercharger 30 and the exhaust gas after-treatment device 31 are effectively accommodated in the expanded space S, the distance from the exhaust manifold 20 to the exhaust gas after-treatment device 31 via the turbine 30B is shortened and it is possible to effectively suppress a decrease in the exhaust gas temperature at the inlet of the exhaust gas after-treatment device 31. Further, as the decrease in the temperature of the exhaust gas flowing into the exhaust gas after-treatment device 31 is suppressed, a decrease in the catalyst temperature is effectively suppressed and the exhaust gas purification performance can be reliably improved.

Meanwhile, the disclosure is not limited to the above-described embodiments, but can be appropriately modified and implemented without departing from the spirit of the disclosure.

For example, the engine 10 has been described to have a configuration that the intake system is connected to the left surface 10L and the exhaust system is connected to the right surface 10R. However, the intake system may be connected to the right surface 10R and the exhaust system may be connected to the left surface 10L. In this case, the engine 10 may be mounted such that the right surface 10R to which the intake system is connected is inclined to the right side of the vehicle body. Further, the engine 10 is not limited to a diesel engine, but can be widely applied to other engines such as a gasoline engine.

The present application is based on Japanese Patent Application (Patent Application No. 2015-231686) filed on Nov. 27, 2015, the contents of which are incorporated herein as a reference.

INDUSTRIAL APPLICABILITY

The disclosure has an effect that a space of an engine room can be effectively utilized and is useful for an engine mounting structure or the like.

REFERENCE SIGNS LIST

1 Cab-Over Type Vehicle
2 Cab
3L Left Chassis Frame
3R Right Chassis Frame
10 Engine
10L Left Surface
10R Right Surface
11 Intake Manifold
12 Intake Pipe
20 Exhaust Manifold
21 Exhaust Pipe
30 Supercharger
30A Compressor
30B Turbine
31 Exhaust gas after-treatment device
40 Right Bracket
50 Left Bracket
60 Right Mounting Member
61 Left Mounting Member
70 Oil Pan

The invention claimed is:

1. An engine mounting structure for a cab-over type vehicle, in which an engine is mounted on a pair of left and right chassis frames extending in a front and rear direction of a vehicle body and a cab is disposed above the engine,
wherein an exhaust system is connected to one of left and right side surfaces of the engine, and
wherein the engine is mounted on the chassis frames in a state of being inclined at a predetermined angle such that the one side surface faces obliquely upward, the engine mounting structure comprising:
a first bracket configured to support a first side of the engine on a first chassis frame via a first mount member; and
a second bracket configured to support a second side of the engine on a second chassis frame via a second mount member,
wherein the first bracket comprises a first plate portion attached to the first mount member and a second plate portion attached to the first side of the engine, the first plate portion and the second plate portion forming an obtuse angle,
wherein the second bracket comprises a third plate portion attached to the second mount member and a fourth plate portion attached to the first side of the engine, the third plate portion and the fourth plate portion forming an acute angle, and
wherein a supercharger and an after-treatment device are disposed on the first side of the engine.

2. The engine mounting structure according to claim 1, wherein the engine comprises a supercharger that is disposed adjacent to the one side surface.

3. The engine mounting structure according to claim 2,
wherein an exhaust gas after-treatment device is connected to the exhaust system on the downstream side of the supercharger, and
wherein the exhaust gas after-treatment device is disposed adjacent to the supercharger.

4. The engine mounting structure according to claim 1, further comprising:

an intake manifold disposed on the second side of the engine; and an intake pipe configured to connect the intake manifold and the supercharger to each other.

* * * * *